(12) United States Patent
Cadambi et al.

(10) Patent No.: US 8,984,519 B2
(45) Date of Patent: Mar. 17, 2015

(54) SCHEDULER AND RESOURCE MANAGER FOR COPROCESSOR-BASED HETEROGENEOUS CLUSTERS

(75) Inventors: Srihari Cadambi, Princeton Junction, NJ (US); Srimat Chakradhar, Manalapan, NJ (US); M. Mustafa Rafique, Blacksburg, VA (US)

(73) Assignee: NEC Laboratories America, Inc., Princeton, NJ (US)

( * ) Notice: Subject to any disclaimer, the term of this patent is extended or adjusted under 35 U.S.C. 154(b) by 579 days.

(21) Appl. No.: 13/272,763

(22) Filed: Oct. 13, 2011

(65) Prior Publication Data
US 2012/0124591 A1 May 17, 2012

Related U.S. Application Data

(60) Provisional application No. 61/414,454, filed on Nov. 17, 2010, provisional application No. 61/483,950, filed on May 9, 2011.

(51) Int. Cl.
*G06F 9/46* (2006.01)
*G06F 9/50* (2006.01)

(52) U.S. Cl.
CPC ........ *G06F 9/505* (2013.01); *G06F 2209/5019* (2013.01)
USPC .......................................... 718/103; 718/104

(58) Field of Classification Search
None
See application file for complete search history.

(56) References Cited

U.S. PATENT DOCUMENTS

| 6,393,433 | B1 * | 5/2002 | Kalavade et al. | 1/1 |
|---|---|---|---|---|
| 6,490,496 | B1 * | 12/2002 | Dacey | 700/118 |
| 8,176,490 | B1 * | 5/2012 | Jackson | 718/100 |
| 2005/0097556 | A1 * | 5/2005 | Code et al. | 718/102 |
| 2005/0223382 | A1 * | 10/2005 | Lippett | 718/103 |
| 2006/0106931 | A1 * | 5/2006 | Richoux | 709/226 |
| 2006/0168571 | A1 * | 7/2006 | Ghiasi et al. | 717/127 |
| 2007/0143764 | A1 * | 6/2007 | Kern et al. | 718/104 |
| 2008/0103861 | A1 * | 5/2008 | Zhong | 705/8 |
| 2008/0222640 | A1 * | 9/2008 | Daly et al. | 718/103 |
| 2008/0320352 | A1 * | 12/2008 | Udell et al. | 714/739 |

(Continued)

OTHER PUBLICATIONS

Alhusaini, A., et al. "A Unified Resource Scheduling Framework for Heterogeneous Computing Environments" Proc. Eighth Heterogeneous Computing Workshop (HCW '99), Apr. 1999. (10 Pages).

Hindman, B., et al. "Mesos: A Platform for Fine-Grained Resource Sharing in the Data Center" University of California at Berkeley—Technical Report No. UCB/EECS-2010-87. May 2010. pp. 1-16.

(Continued)

*Primary Examiner* — Camquy Truong
*Assistant Examiner* — Mehran Kamran
(74) *Attorney, Agent, or Firm* — Joseph Kolodka

(57) ABSTRACT

A system and method for scheduling client-server applications onto heterogeneous clusters includes storing at least one client request of at least one application in a pending request list on a computer readable storage medium. A priority metric is computed for each application, where the computed priority metric is applied to each client request belonging to that application. The priority metric is determined based on estimated performance of the client request and load on the pending request list. The at least one client request of the at least one application is scheduled based on the priority metric onto one or more heterogeneous resources.

19 Claims, 5 Drawing Sheets

(56) References Cited

U.S. PATENT DOCUMENTS

| | | | |
|---|---|---|---|
| 2009/0100435 A1* | 4/2009 | Papaefstathiou et al. | 718/104 |
| 2009/0276781 A1* | 11/2009 | Chan et al. | 718/103 |
| 2010/0077403 A1* | 3/2010 | Yang et al. | 718/104 |
| 2010/0223618 A1* | 9/2010 | Fu et al. | 718/102 |
| 2011/0078696 A1* | 3/2011 | Blackburn et al. | 718/104 |
| 2011/0093854 A1* | 4/2011 | Blanc et al. | 718/101 |
| 2011/0119680 A1* | 5/2011 | Li et al. | 718/106 |
| 2011/0212761 A1* | 9/2011 | Paulsen et al. | 463/25 |
| 2012/0030685 A1* | 2/2012 | Jackson | 718/104 |
| 2012/0096468 A1* | 4/2012 | Chakravorty et al. | 718/103 |
| 2013/0080824 A1* | 3/2013 | Barsness et al. | 714/4.2 |
| 2013/0145029 A1* | 6/2013 | Jackson | 709/225 |

OTHER PUBLICATIONS

Isard, M., et al. "Quincy: Fair Scheduling for Distributed Computing Clusters" Proceedings of the 22nd ACM Symposium on Operating Systems Principles 2009, SOSP 2009. Oct. 2009. pp. 1-20.

Jimenez, V., et al. "Predictive Runtime Code Scheduling for Heterogeneous Architectures" High Performance Embedded Architectures and Compilers, Fourth International Conference, HiPEAC 2009. Jan. 2009. (15 Pages).

Maheswaran, M., et al. "A Dynamic Matching and Scheduling Algorithm for Heterogeneous Computing Systems" Seventh Heterogeneous Computing Workshop. Mar. 1998. (13 Pages).

* cited by examiner

SCHEDULER AND RESOURCE MANAGER FOR COPROCESSOR-BASED HETEROGENEOUS CLUSTERS

RELATED APPLICATION INFORMATION

This application claims priority to provisional application Ser. No. 61/414,454 filed on Nov. 17, 2010 and provisional application Ser. No. 61/483,950 filed on May 9, 2011, both applications incorporated herein by reference.

BACKGROUND

1. Technical Field

The present invention relates to coprocessor-based heterogeneous clusters, and more particularly, to a scheduler and resource manager for coprocessor-based heterogeneous clusters.

2. Description of the Related Art

Coprocessor-based heterogeneous clusters are those whose nodes have one or more coprocessors as accelerators. Coprocessors may include, e.g., graphics processing units (GPUs). Such heterogeneous clusters are increasingly being deployed to accelerate non-graphical compute kernels, such as large scientific and compute-intensive jobs. At the same time, client-server applications are becoming more computationally intensive. In a client-server application, an important metric is response time, or the latency per request. Latency per request can be improved by using, e.g., GPUs.

For better utilization, multiple client-server applications should be able to concurrently run and share heterogeneous clusters (i.e., the cluster should support multi-tenancy). Further, the response times of the heterogeneous clusters for processing client requests should be largely immune to load variations and unpredictable load spikes. Thus, any practical heterogeneous cluster infrastructure should be able to handle multi-tenancy and varying load while delivering an acceptable response time for as many client requests as possible. For a heterogeneous cluster to handle client-server applications with load spikes, a scheduler that enables dynamic sharing of coprocessor-based heterogeneous resources is necessary.

SUMMARY

A system of a scheduler for scheduling client-server applications onto heterogeneous clusters includes a pending request list configured to store at least one client request of at least one application on a computer readable storage medium. A priority metric module is configured to compute a priority metric for each application and the computed priority metric is applied to each client request belonging to that application. The priority metric is determined based on estimated performance of the client request and load on the pending request list. The scheduler is configured to schedule the at least one client request of the at least one application based on the priority metric onto one or more heterogeneous resources.

A system of a scheduler for scheduling client-server applications onto heterogeneous clusters includes a performance estimator module configured to dynamically model performance of at least one client request of a new application on the heterogeneous resources. A pending request list is configured to store at least one client request of at least one application on a computer readable storage medium. A priority metric module is configured to compute a priority metric for each application and the computed priority metric is applied to each client request belonging to that application. The priority metric is determined based on estimated performance of the client request and load on the pending request list. The scheduler is configured to pack more than one client requests belonging to an application together and schedule at least one client request of the at least one application based on the priority onto one or more heterogeneous resources.

A method for scheduling client-server applications onto heterogeneous clusters includes storing at least one client request of at least one application in a pending request list on a computer readable storage medium. A priority metric is computed for each application and the computed priority metric is applied to each client request belonging to that application. The priority metric is determined based on estimated performance of the client request and load on the pending request list. The at least one client request of the at least one application is scheduled based on the priority metric onto one or more heterogeneous resources.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
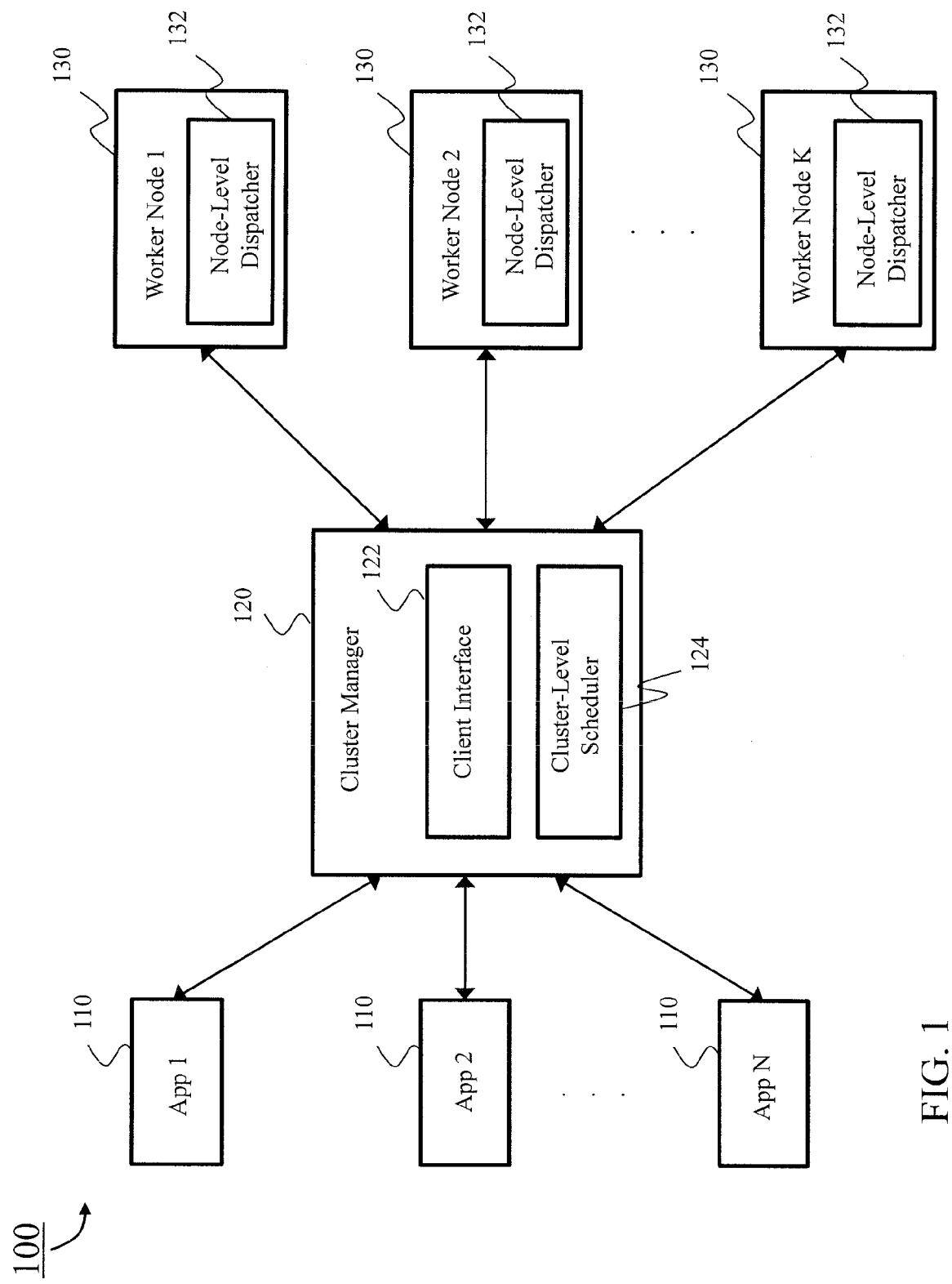
FIG. 1 is a block/flow diagram showing a high-level system/method architecture of the scheduler and resource manager for coprocessor-based heterogeneous resources in accordance with one illustrative embodiment.

In accordance with the present principles, systems and methods are provided for the scheduling and resource managing of coprocessor-based heterogeneous resources. In one embodiment, coprocessor-based heterogeneous resources include graphics processing units (GPUs). Advantageously, GPUs provide for a faster resource while being able to be easily added to or removed from existing systems with low setup and operational costs. A middleware framework is provided, which includes a cluster manager and several worker nodes, to enable efficient sharing of coprocessor-based heterogeneous cluster resources. Each worker node includes at least one central processing unit (CPU) and at least one GPU. The cluster manager, which executes the cluster-level scheduler, receives client requests and schedules them on available worker nodes. Each worker node includes a node-level dispatcher that intercepts and dispatches the scheduled tasks to local resources (e.g., CPUs and/or GPUs) as directed by the cluster manager. The term "tasks" will be used synonymously with the term "client requests" throughout this application. After a client request is processed by the worker nodes, the cluster manager may consolidate the results from the individual worker nodes before sending them back to the clients. The present principles enable the efficient sharing of heterogeneous cluster resources while delivering acceptable client request response times despite load spikes.

In one embodiment, scheduling is based on a priority metric such that the tasks of the application with the highest priority metric are selected first for immediate scheduling. The priority metric may be computed based on the actual achieved performance for recently processed tasks, the desired performance, the number of unprocessed requests, the number and types of resources allocated, and the average processing time needed to process each queue item. Alternatively, the priority metric may be computed based on the request's slack, the expected processing time, and the load on each application. In another embodiment, client requests belonging to the selected application are packed together before being dispatched to the worker nodes. In yet another embodiment, a dynamic data collection for building CPU/GPU performance models is performed for each new application to find suitable resources for that application and optimize performance by estimating performance of a task of an application on the heterogeneous resources.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a high-level system architecture of scheduler 100 is illustratively depicted in accordance with one embodiment. Scheduler 100 provides scheduling of application tasks onto heterogeneous resources to allow each task to achieve its desired Quality of Service (QoS). In the present application, the QoS refers to client request response time. Each application 110 specifies an acceptable response time for the user requests. All applications 110 have a client interface 122 and a server portion. The server portion is mapped to specific cluster nodes and is expected to be running with scheduler 100. It is assumed that applications 110 already have optimized CPU and GPU implementations available in the form of runtime libraries with well-defined interfaces. This enables scheduler 100 to intercept calls at runtime and dispatch them to the heterogeneous resources.

Client interface 122 receives requests from multiple concurrently running applications 110, and sends them to cluster manager 120 to schedule them on worker nodes 130. Scheduler 100 consists of two distinct portions: cluster-level scheduler 124 and node-level dispatcher 132. Cluster-level scheduler 124 is run on cluster manager 120 to manage worker nodes 130. Cluster manager 120 may be a dedicated general-purpose multicore server node. Worker nodes 130 may be back-end servers.

Worker nodes 130 include heterogeneous computational resources comprising, e.g., conventional multicores and Compute Unified Device Architecture (CUDA) enabled GPUs. Advantageously, GPUs can be easily added to or removed from existing systems with low setup and operational costs. Cluster manager 120 and worker nodes 130 may be inter-connected using a standard interconnection network (e.g., gigabit Ethernet).

Figure 2:
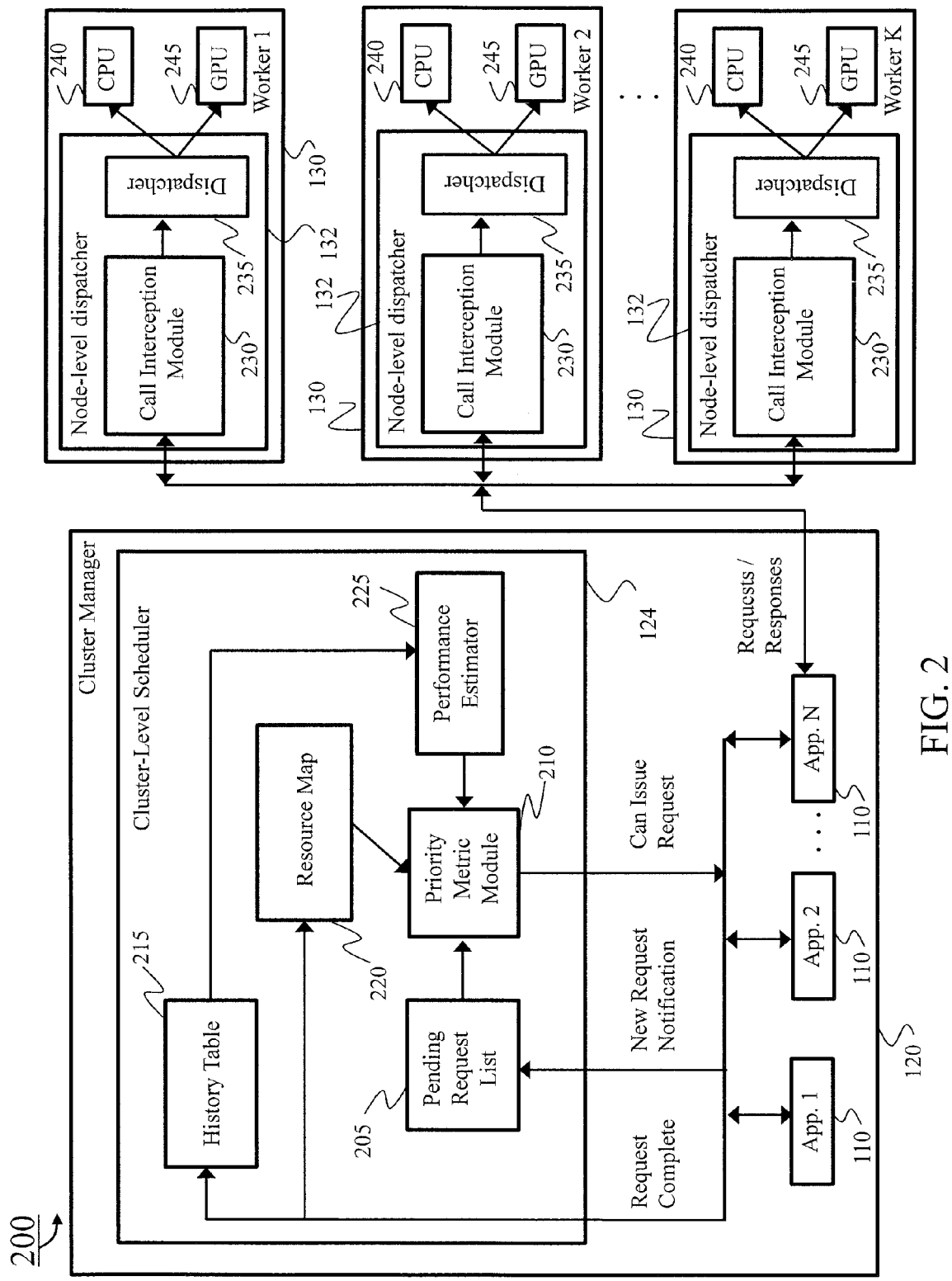
FIG. 2 is a block/flow diagram showing a system/method of the scheduler and resource manager for coprocessor-based heterogeneous resources in accordance with one illustrative embodiment.

Referring now to FIG. 2, a system of a scheduler and resource manager for coprocessor-based heterogeneous resources 200 is illustratively depicted in accordance with one embodiment. To use the system of a scheduler and resource manager for coprocessor-based heterogeneous resources 200, each application 110 initially registers itself with cluster-level scheduler 124 and sends notifications to cluster-level scheduler 124 each time it receives a client request. New requests are stored in pending request list 205. Application 110 waits until priority metric module 210 of cluster-level scheduler 124 indicates that the request can be processed before dispatching the requests. Once requests have completed processing on worker nodes 130, application 110 informs cluster-level scheduler 124, which updates history table 215 and resource map 220. In doing so, applications 110 may utilize two threads: one to notify cluster-level scheduler 124 of new requests and the other to ask if requests can be issued and inform the cluster-level scheduler 124 of completion.

Each application may provide information through an Application Programming Interface (API). First, applications 110 register with cluster-level scheduler 124 using the newAppRegistration( ) API and specifies a number of arguments. For example, applications 110 may specify its expected response time for each client request, the average number of client requests it expects to receive each second, the set of cluster nodes onto which its static data has been mapped, and how many nodes each request will require for processing. Optionally, applications 110 may also specify how many requests it can consolidate together. For each new client request, applications 110 notify cluster-level scheduler 124 using the newRequestNotification( ) API, specifying the size of the request as an argument. Cluster-level scheduler 124 then provides the go-ahead to applications 110 for issuing pending requests using the canIssueRequests( ) API and provides a unique identifier for this set of requests as an argument. Applications 110 then issue the requests and informs cluster-level scheduler 124 of its completion using the API requestComplete( ) specifying the unique identifier. The APIs and arguments of the above-described application programming interface are illustratively depicted in Table 1. It is noted that the APIs and arguments used by cluster-level scheduler 124 are application specific. The APIs and arguments discussed herein are illustrative and not meant to be limiting.

TABLE 1

Example list of APIs and arguments

| API | ARGUMENTS | DESCRIPTION |
| --- | --- | --- |
| void newAppRegistration( ) | | Application registers with scheduler |
| | float response_time | Expected latency (ms) for each client request |
| | float average_load | Average number of requests expected every second |
| | int * nodelist | Possible cluster nodes on which a client request could be processed |
| | int nodelist_size | Size of above nodelist |
| | int num_nodes | Number of nodes necessary to process a client request |
| | int consolidate | Number of requests that can be consolidated by application |
| void newRequestNotification( ) | | Application notifies scheduler of the arrival of a new request |
| | int size | Size of data sent by request |
| bool canIssueRequests( ) | | Application asks scheduler if requests can be issued |
| | int * num_reqs | Number of consecutive requests that can be consolidated and issued |
| | int * id | Unique scheduler ID for this set of requests |
| | int * nodes | Which cluster nodes to use |
| | int * resources | Which resources to use within each cluster node |
| void requestComplete( ) | | Application informs scheduler that issued requests have completed processing |
| | int id | Scheduler ID pertaining to the completed requests |

Continuing to refer to FIG. 2, the architecture of cluster-level scheduler 124 may include the following components: pending request list 205, resource map 220, history table 215, performance estimator 225, priority metric module 210 and a load balancer, which is not shown in FIG. 2. Cluster-level scheduler 124 decides which application 110 should issue requests, how many requests application 110 should consolidate, which worker node 130 the request should be sent to, and which processing resource (e.g., CPU 240 or GPU 245) in worker node 130 should process the requests. As described above, cluster-level scheduler 124 communicates with applications 110 using an API.

Cluster-level scheduler 124 receives incoming application requests from applications 110 and stores them in pending request list 205. Pending request list 205 stores additional information pertaining to the pending requests, such as the application that received the request, the time at which the request was received, the deadline by which the request should complete, and the size of the request data. The pending request list 205 may be used to determine the input load on each application 110 and to keep track of the average task arrival rate for each application 110. The average task arrival rate is used to determine if a particular application 110 is experiencing a load spike.

History table 215 stores the details of recently completed tasks of each application 110. Each entry of history table 215 may include executed user requests, resources allocated, and the actual time taken by the allocated resources to execute the user requests. History table 215 is updated each time an application task is completed.

The information stored in history table 215 is used to dynamically build a linear performance model using performance estimator 225. The goal is to estimate performance on the CPU 240 or GPU 245 so that the requests can be issued with minimal QoS failures. After collecting request sizes and corresponding execution times in history table 215, performance estimator 225 fits the data into a linear model to obtain CPU or GPU performance estimations based on request sizes. The model is dependent on the exact type of CPU or GPU. For different generations of CPUs and GPUs, a model can be developed for each specific kind. In addition, existing analytical models can also be used to estimate the execution time of an application on available resources.

Resource map 220 includes the current resource allocation information for each application, including a map of the applications that are being executed on each particular resource. This information is used by cluster-level scheduler 124 to make scheduling decisions. Resource map 215 is also used to determine the load on each worker and to balance the load across the entire cluster.

Cluster-level scheduler 124 may also include a load balancer, which is not shown in FIG. 2. It is assumed that the server components of applications 110 and any static application data are pre-mapped to the cluster nodes. Client requests can be processed by a subset of these nodes and application 110 tells cluster-level scheduler 124 how many nodes are requested to process the request (through the API). When cluster-level scheduler 124 directs an application 110 to issue requests, cluster-level scheduler 124 provides a list of the least loaded cluster nodes. The application 110 is expected to issue its requests to these nodes and thus maintain overall load balancing.

Priority metric module 210 generates a priority metric (PM) to adjust the allocated resources for each application 110 so that tasks may be completed within an acceptable QoS.

The goal of priority metric module 210 is to indicate which of the applications 110 is most critical and which resources (e.g., CPU 240 or GPU 245) should process that request. The PM is computed for each application rather than for each individual task. The PM of each application is then applied for all tasks belonging to that application. An illustrative priority metric is provided for in equations (1) and (2), in accordance with one embodiment, as follows:

$$PM_{app} = \text{ratio between actual and required } QoS \times \text{queue items per allocated resources} \times \text{processing time per queue item} \quad (1)$$

$$PM_{app} = \frac{AQoS}{QoS} \times \frac{NR}{RA} \times T \quad (2)$$

where AQoS is the actual achieved performance for recently processed tasks, QoS is the desired performance, NR is the number of unprocessed requests in pending request list 205, RA is the number and types of resources allocated, and T is the average processing time needed to process each queue item.

An application lagging behind in meeting the QoS or experiencing a spike in the user requests results in a higher PM value by priority metric module 212. A higher PM value leads to an increase in priority and more computational resources are allocated to enable it to meet the QoS.

In another embodiment, the PM is a function of three dynamic parameters: the request's slack, the request's expected processing time, and the load on each application. The heterogeneous cluster has r types of resources in each node, labeled $R_1$ through $R_r$. For example, if a node has 1 CPU and 1 GPU, r is 2. Additionally, it is assumed that all nodes to which an application is mapped are identical.

The application itself is responsible for actual request consolidation, but scheduler 213 indicates how many requests can be consolidated. To do this, scheduler 213 is aware of the maximum number of requests $MAX_A$ that application A can consolidate. So if A is the most critical application, scheduler 213 simply directs it to consolidate the minimum of $MAX_A$ or $n_A$ requests, where $n_A$ is the number of requests in the pending request list for application A.

The request's slack represents how long the request can be pending before it is to be processed to satisfy response time constraints. The slack for request k of application A on resource R is provided in equation (3).

$$\text{Slack}_{k,A,R} = DL_{k,A} - (CT + EPT_{k,A,R}) \quad (3)$$

where $DL_{k,A}$ is the deadline for request k of application A, CT is the current time, and $EPT_{k,A,R}$ is the estimated processing time of request k of application A on resource R.

In one embodiment, the requesting task's estimated processing time may be computed by performance estimator 225 by dynamically building a linear performance model based on its historical performance in history table 214. Alternatively, existing analytical models can also be used to estimate processing time of a task. Initially, in the absence of historical information, $EPT_{k,A,R}$ is assumed to be zero. Resource R is either the CPU 240 or GPU 245. If the system has different types of CPUs and GPUs, then each type would be a resource since it would result in a different estimated processing time. A zero slack indicates the request should be issued immediately, while a negative slack indicates the request is overdue.

Given the slack, urgency of request k of application A on resource R is provided in equation (4). Urgency increases exponentially as the slack nears zero.

$$U_{k,A,R} = 2^{-\text{slack}_{k,A,R}} \quad (4)$$

To account for load spikes, the load for each application A is calculated using the average number of pending requests in the queue ($n_A$) and the average number of requests expected every second ($navg_A$) specified at the time of application registration. Application registration is discussed above with respect to the API. Load is provided for in equation (5).

$$L_A = n_A / navg_A \quad (5)$$

The urgency of issuing the requests of application A on R is the product of the urgency of issuing the first pending request of A and the load of A. This is provided in FIG. 6).

$$U_{A,R} = \begin{cases} U_{1,A,R} \times L_A, & \text{if } R \text{ is available} \\ -\infty, & \text{otherwise.} \end{cases} \quad (6)$$

The overall urgency for issuing A's request is the minimum urgency across all available resources $R_i$. The urgency for issuing A's request is provided in equation (7), where r is the number of different types of resources in each cluster node.

$$U_A = \min_{i=1}^{r}(|U_{A,R_i}|) \quad (7)$$

Given the urgency for all applications, scheduler 213 will request application A to consolidate and issue q requests to resource R such that application A has the highest urgency $U_A$, q is the minimum of $MAX_A$ and $n_A$, and R is the resource which, when scheduled on which application A, has minimum urgency. It is noted that if the request falls behind in meeting its deadline, its urgency sharply increases (equation (4)). If an application experiences a load spike, its urgency sharply increases (equation (6)). Request issuance is predicated on resource availability (equation (6)). The resource with the best chance of achieving the deadline is chosen since that resource will have the lowest urgency (equation (7)). Pseudocode example 1 shows one illustrative approach to implement the priority metric, in accordance with one embodiment.

Pseudocode Example 1

```
Input: appList, reqList, resList, DL, EPT
Output: app, q, R
    for all A in appList do
        for all k in reqList do
            slack_{k,A,R} = calculateSlack(DL_{k,A},EPT_{k,A,R})
            U_{k,A,R} = calculateReqUrgency(slack_{k,A,R})
            if k ≥ MAX_A then
                break
            end if
        end for
        n_A = getAppReqCount(A)
        navg_A = getAvgAppReqCount(A)
        L_A = n_A / navg_A
    end for
    for all A in appList do
        k = getEarliestRequest(A)
        for all R in resList do
            if res Available (R) then
                U_{A,R} = U_{k,A,R} L_A
            else
                U_{A,R} = -∞
            end if
        end for
        U_A = getMinimum(U_{A,R},resList)
    end for
    /* Select application app to issue q requests to resource R */
    app = getAppHighestUrgency( )
    R = getResWithLowestUrgency(app)
    q = MIN(MAXapp,napp)
```

Tasks of applications 110 are sorted based on their priority metric, with the application that has the highest priority metric given the highest priority and selected for immediate scheduling. Cluster-level scheduler 124 then checks history table 215 for the recently completed QoS for the selected application 110 to determine if the application 110 is currently providing an acceptable QoS. If the application 110 is adequately providing an acceptable QoS and the number of user requests in the pending request list 205 is less than the normal input load for that application 110, then no change is made to the resources allocated for that application 110. However, if history table 215 shows that recent tasks for that application 110 have not had an acceptable QoS, or if the number of the user requests in pending request list 205 is more than the normal input load, then more resources are allocated for that application 110.

Once scheduling of the application 110 with the highest priority metric is completed, cluster-level scheduler 124 selects the next application 110 with the highest priority metric and schedules the requests for that application 110 in the same manner. The scheduling iteration is repeated until all applications have been scheduled.

If no free resources are available, then resources are made available by de-allocating the resources from the application 110 with the minimum priority metric and re-allocating those resources to the particular application 110 with the higher priority metric that needs more resources to provide an acceptable QoS. It is noted that if the application 110 with the minimum priority metric needs more resources, then the number of resources in the heterogeneous cluster are not sufficient to provide an acceptable QoS for all the hosted applications 110. Cluster-level scheduler 124 prioritizes applications 110 based on the priority metric and the application 110 with the highest priority metric is selected. Therefore, the resources that have already been allocated will not have to be reduced for any application 110, even if it exceeds in providing an acceptable QoS. All other applications 110 with lesser priority metrics than the selected application's priority metric should also exceed in providing their respective performance threshold. Additionally, although the user request within the application 110 may be serviced in first in, first out order, the user requests across different applications 110 may be served out-of-order based on the priority metric and performance of each application 110.

Node-level dispatchers 132 include call interception module 230 and dispatcher 235 and run on each worker node 130. Node-level dispatchers 132 are responsible for receiving an issued request and directing it to the correct resource (e.g., CPU 240 and/or GPU 245) as specified by cluster-level scheduler 124. It is assumed that parallelizable kernels in the applications 110 have both CPU and GPU implementations available as dynamically loadable libraries. Node-level dispatchers 130 uses call interception module 230 to intercept the call to the kernel. At runtime, dispatcher 235 directs the call to CPU 240 and/or GPU 245. If a task is executed on more than one computational resource, then the partial results produced by each resource are merged locally by cluster manager 120. The merged results are sent back to the client interface server.

Each application task is run until completion on the specified resources. Cluster manager 120 maintains a thread pool where one thread executes the specified application 110 on the given heterogeneous resource. Cluster manager 120 keeps track of the resources that are currently being allocated to a particular application. This allows the cluster manager 120 to initialize the application 110 on the allocated resources and warm the resource memory with the application data. This may be needed if the specific resource was previously vacant or was allocated to a different application 110. If the same resources are being used for executing the next application tasks, then all application data that may be needed is already in its memory and there is no need to copy the application data to the resource memory.

The scheduler and resource manager for coprocessor-based heterogeneous resources include at least three main threads running concurrently to provide scheduling. The performance collector thread dynamically builds CPU/GPU performance models of tasks of a new application on different resources to find suitable resources and optimize performance of the heterogeneous resources. The scheduler thread performs the core of the scheduling and dispatching. The receiver thread receives results and updates history table 215 and resource map 220. Additionally, there is a listener thread that adds incoming client requests to pending request list 205.

Figure 3:
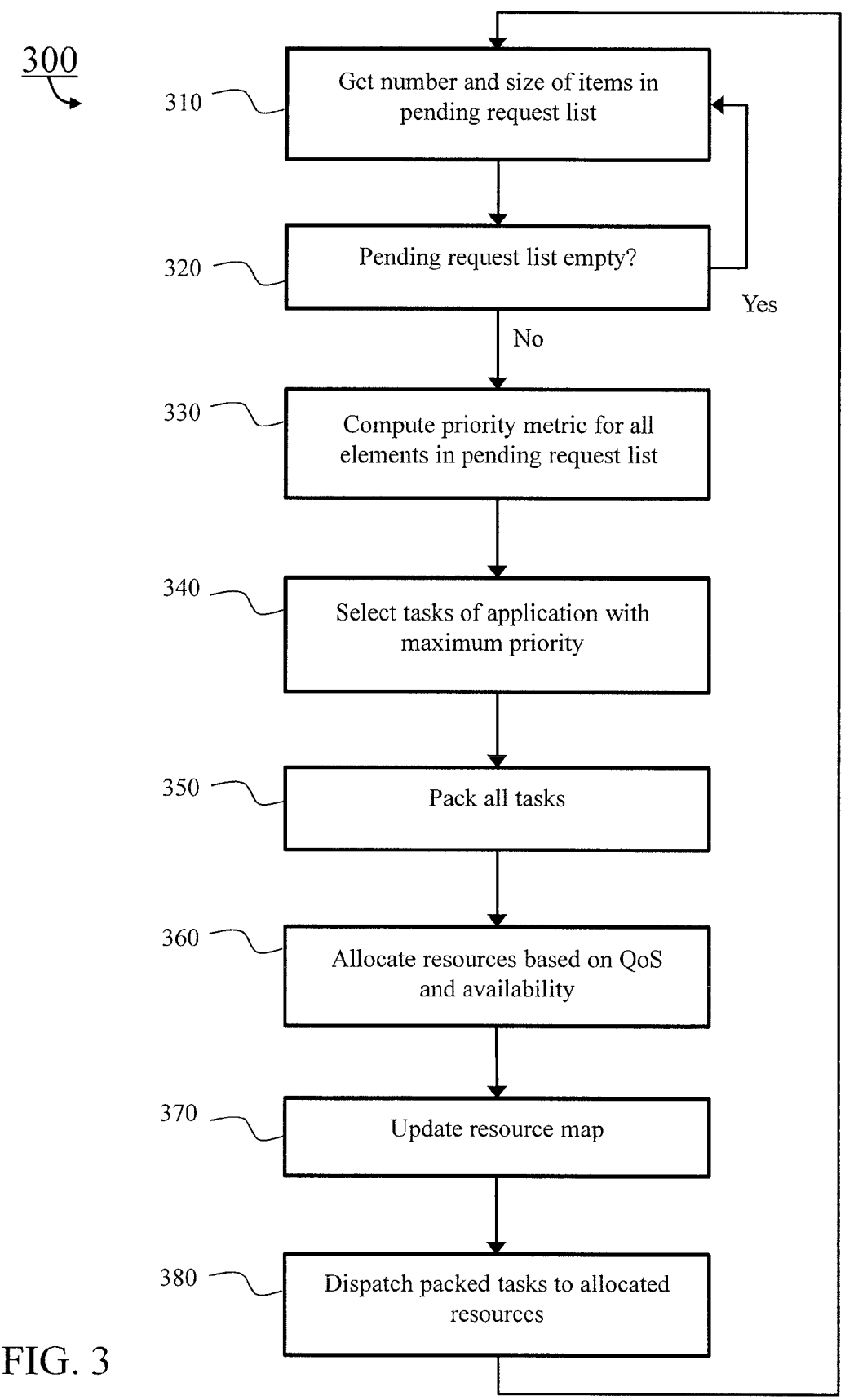
FIG. 3 is a block/flow diagram showing a system/method of the performance collector thread of the scheduler and resource manager for coprocessor-based heterogeneous resources in accordance with one illustrative embodiment.

Referring now to FIG. 3, a block/flow diagram of scheduler thread 300 is illustratively depicted in accordance with one embodiment. Scheduler thread 300 performs the core of the scheduling and dispatching. This allows the middleware framework to intelligently manage and utilize the heterogeneous resources. Initially, in block 310, scheduler thread 300 will get the number and size of items in pending request list 205 of FIG. 2. Pending request list 205 stores requests from each application 110. The stored metadata may include the application id, the item arrival time, size of the user request data, application to node mapping, and a pointer to the actual data of the request. In block 320, scheduler thread 300 will determine if pending request list 205 is empty. If pending request list 205 is empty, scheduler thread 300 will continue to check for the number and size of items until there is at least one item in pending request list 205.

If pending request list 205 is not empty, a priority metric is computed for each application 110 in pending request list 205 in block 330. The priority metric allows scheduler thread 300 to reorder requests across different applications so that the requests achieve an acceptable QoS. In one embodiment, the PM is determined based on the actual achieved performance for recently processed requests, desired performance, the number of unprocessed requests in pending request list 205, the number and types of resources allocated, and the average processing time required to process each queue item. In another embodiment, the PM is a function of the request's slack, the request's expected processing time, and the load on each application 110. Tasks are arranged using the PM, with the task with the highest PM given the highest priority.

In block 340, the application 110 with the highest priority metric is selected for immediate scheduling. Tasks of the selected application 110 are packed together in block 360, which may result in improved performance. Scheduler thread 300 may pack as many pending requests together as possible. In block 370, resources are allocated based on QoS and availability. To allocate resources, cluster-level scheduler 124 consults history table 215 and resource map 220 of FIG. 2. Resource map 215 of FIG. 2 is updated in block 370 to reflect the resource allocation. In block 380, the packed tasks are dispatched to the allocated resources. Cluster-level scheduler 124 gets the number and type of resources where the request should be executed from resource map 215 and sends the request to node-level dispatchers 132, which will dispatch the tasks on CPU 240 and/or GPU 245 as indicated by cluster-level scheduler 124. Once the task has been dispatched, scheduler thread 300 repeats this process by selecting the next application 110 with the highest PM. This process is repeated until all tasks have been dispatched.

Figure 4:
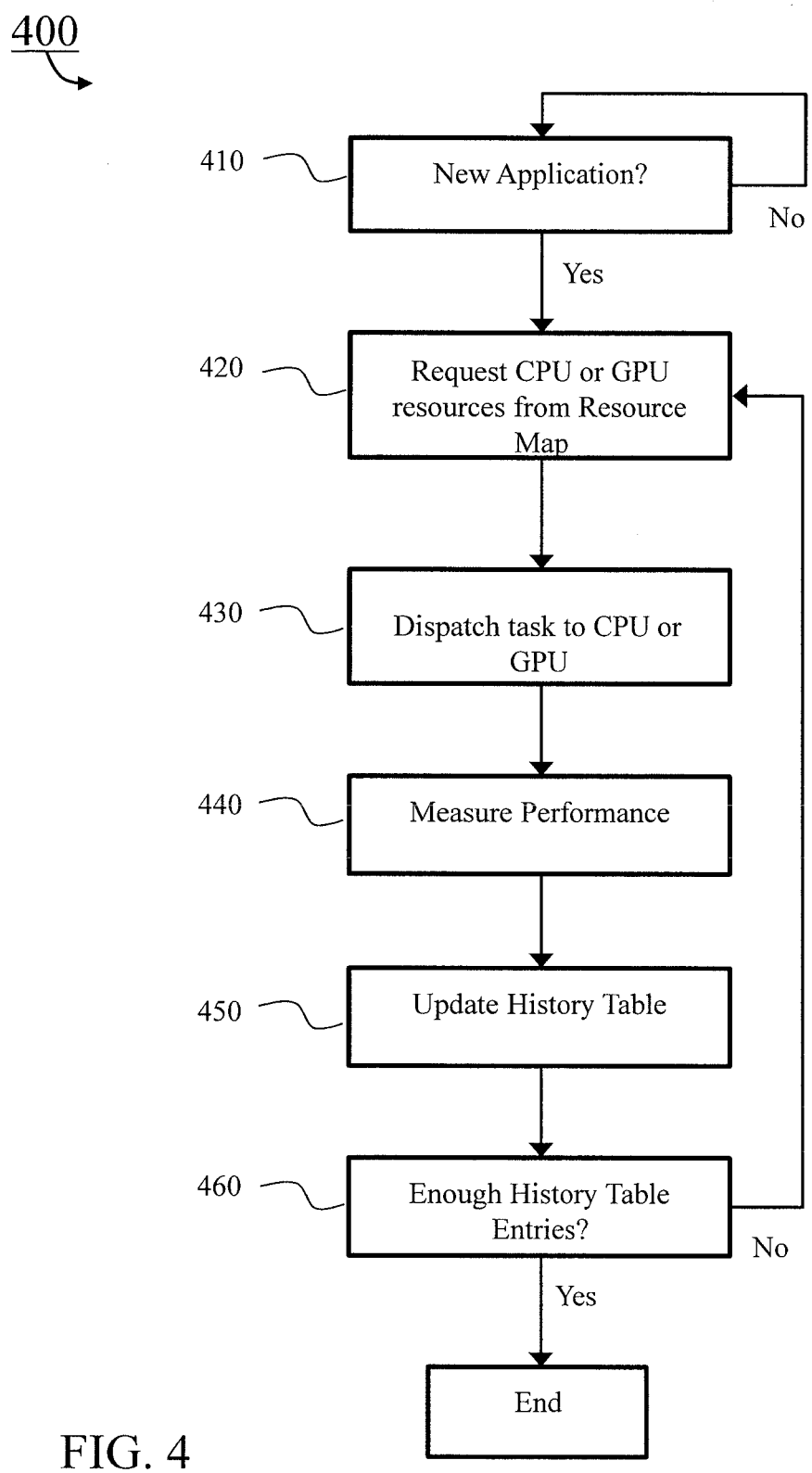
FIG. 4 is a block/flow diagram showing a system/method of the scheduler thread of the scheduler and resource manager for coprocessor-based heterogeneous resources in accordance with one illustrative embodiment.

Referring now to FIG. 4, a block/flow diagram of the performance collector thread 400 is illustratively depicted in accordance with one embodiment. The performance collector thread uses performance estimator 225 of FIG. 2 to dynamically build CPU/GPU performance models dynamically. In block 410 of FIG. 4, performance collector thread 400 checks to determine whether an application 110 is newly registered with cluster manager 120. The performance of new applications 110 on the different resources is unknown. Performance collector thread 400 performs a learning phase when executing the initial user request of a new application 110 to find suitable resources for the new application 110 and optimize performance. If the application 110 is not new, performance collector thread 400 will continue to check for new applications 110.

In block 420, if an application 110 is new, performance collector thread 400 requests resources from resource map 215 of FIG. 2. Resources may include CPU and/or GPU resources. The performance of the application tasks will be evaluated on these resources. In block 430, tasks are dispatched to the respective CPU or GPU resource. Dispatching may be performed by dispatcher 224 of FIG. 2. In block 440, performance is measured. Node-level dispatcher 132 measures the performance of the task on the particular resource and sends the results to cluster-level scheduler 124. In block 450, history table 215 of FIG. 2 is updated. Cluster-level scheduler 124 may update history table 215 with application, resource, and performance information. This information may be used for the scheduling of future requests. In block 460, if there are not enough history table 215 entries, the performance collector thread will request another CPU or GPU resource from resource map 220 of FIG. 2 and the process will be repeated. A single entry, for example, in history table 215 may be sufficient. If there are enough history table 215 entries, the performance collector thread will end for that application. In another embodiment, each application task is executed on all available resources on a particular node.

Figure 5:
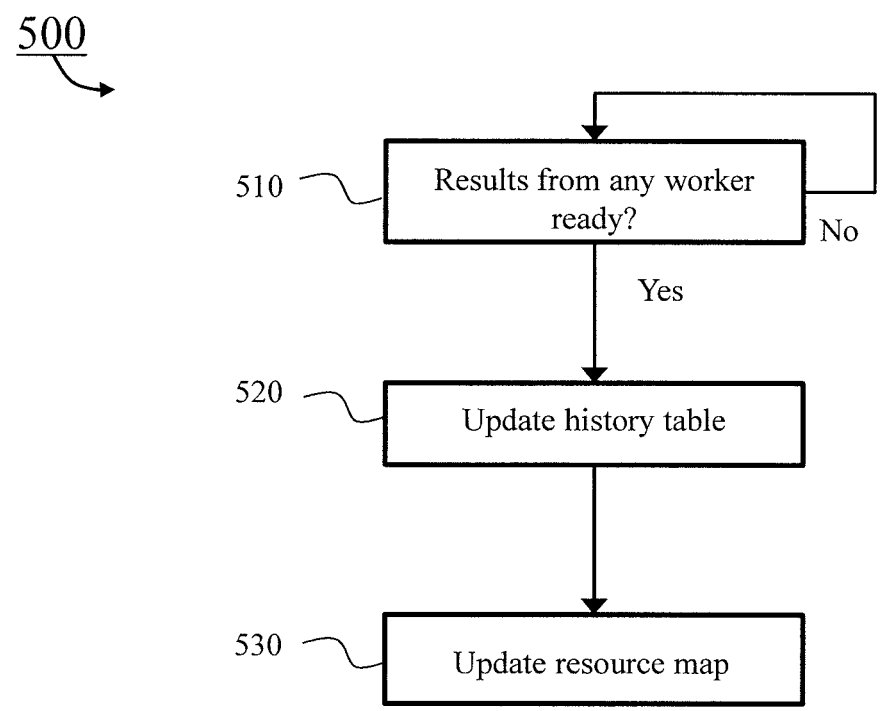
FIG. 5 is a block/flow diagram showing a system/method of the receiver thread of the scheduler and resource manager for coprocessor-based heterogeneous resources in accordance with one illustrative embodiment.

Referring now to FIG. 5, a block/flow diagram of the receiver thread 500 is illustratively depicted in accordance with one embodiment. In block 510, receiver thread 500 checks worker nodes 130 to determine if results are ready. If no results are ready, receiver thread 500 will continue to check until there are worker node 130 results that are ready. If results are ready, receiver thread 500 will update the cluster-level scheduler 124. In block 520, history table 215 is updated to reflect that actual performance of the tasks on the resources. Actual performance may be the actual QoS. In block 530, resource map 220 is updated. Since worker node 130 has completed its scheduled tasks, resource map 220 is updated to reflect that the worker node 130 is available.

Having described preferred embodiments of a scheduler and resource manager for coprocessor-based heterogeneous clusters (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A scheduler for scheduling client-server applications onto heterogeneous clusters of nodes having heterogeneous resources, comprising:

A computer;
a pending request list configured to store at least one client request of at least one application on the computer; and
a priority metric module configured to compute a priority metric for each application, wherein the computed priority metric is applied to each client request belonging to that application, and further wherein the priority metric is determined based on estimated performance of the client request and load on the pending request list, determining a priority metric as:

$PM_{app}$ = ratio between actual and required $QoS$ × queue items per allocated resources × processing time per queue item $$PM_{app} = \frac{AQoS}{QoS} \times \frac{NR}{RA} \times T$$

where AQoS is actual achieved performance for recently processed tasks, QoS (Quality of Service) is desired performance, NR is number of unprocessed requests in pending request list, RA is number and types of resources allocated, and T is an average processing time needed to process each queue item; and wherein the scheduler is configured to schedule the at least one client request of the at least one application based on the priority onto one or more specific heterogeneous resources in one or more specific nodes, and wherein the heterogeneous resources include at least one Central Processing Unit coupled with at least one Graphics Processing Unit at each node.

2. The scheduler as recited in claim 1, wherein the scheduler is further configured to pack more than one client requests belonging to an application together prior to dispatching the packed client requests to a heterogeneous resource.

3. The scheduler as recited in claim 2, wherein the at least one application specifies whether the client requests belonging to the at least one application are to be packed.

4. The scheduler as recited in claim 1, wherein estimated performance of a client request includes dynamically modeling performance of the at least one client request of a new application on the heterogeneous resources.

5. The scheduler as recited in claim 4, wherein dynamically modeling performance includes executing the at least one client request of the new application on all available resources.

6. The scheduler as recited in claim 1, wherein the scheduler includes a scheduler at a cluster level and a scheduler at a node level.

7. The scheduler as recited in claim 1, wherein the priority metric is further determined based on actual performance, desired performance, and the number and type of resources allocated.

8. The scheduler as recited in claim 1, wherein the priority metric is further determined based on a slack of the request.

9. A scheduler for scheduling client-server applications onto heterogeneous clusters of nodes having heterogeneous resources, comprising:

A computer;
a performance estimator module configured to dynamically model performance of at least one client request of a new application on the heterogeneous resources to estimate performance;
a pending request list configured to store at least one client request of at least one application on the computer; and a priority metric module configured to compute a priority metric for each application, wherein the computed priority metric is applied to each client request belonging to that application, and further wherein the priority metric is determined based on the estimated performance of the client request and load on the pending request list, determining a priority metric as:

$PM_{app}$ = ratio between actual and required $QoS$ × queue items per allocated resources × processing time per queue item $$PM_{app} = \frac{AQoS}{QoS} \times \frac{NR}{RA} \times T$$

where AQoS is actual achieved performance for recently processed tasks, QoS (Quality of Service) is desired performance, NR is number of unprocessed requests in pending request list, RA is number and types of resources allocated, and T is an average processing time needed to process each queue item; and wherein the scheduler is configured to pack more than one client requests belonging to an application together and schedule the at least one client request of the at least one application based on the priority onto one or more specific heterogeneous resources in one or more specific nodes, and wherein the heterogeneous resources include at least one Central Processing Unit coupled with at least one Graphics Processing Unit at each node.

10. The scheduler as recited in claim 9, wherein the priority metric is further determined based on actual performance, desired performance, and the number and type of resources allocated.

11. The scheduler as recited in claim 9, wherein the priority metric is further determined based on a request slack.

12. A method for scheduling client-server applications onto heterogeneous clusters of nodes having heterogeneous resources, comprising:
A computer;
storing at least one client request of at least one application in a pending request list on the computer;
computing a priority metric for each application, wherein the computed priority metric is applied to each client request belonging to that application, and further wherein the priority metric is determined based on estimated performance of the client request and load on the pending request list; and determining a priority metric as:

$PM_{app}$ = ratio between actual and required $QoS$ × queue items per allocated resources × processing time per queue item $$PM_{app} = \frac{AQoS}{QoS} \times \frac{NR}{RA} \times T$$

where AQoS is actual achieved performance for recently processed tasks, QoS (Quality of Service) is desired performance, NR is number of unprocessed requests in pending request list, RA is number and types of resources allocated, and T is an average processing time needed to process each queue item; and scheduling the at least one client request of the at least one application based on the priority metric onto one or more specific heterogeneous resources in one or more specific nodes, wherein the heterogeneous resources include at least one Central Processing Unit coupled with at least one Graphics Processing Unit at each node.

13. The method as recited in claim 12, wherein scheduling includes packing more than one client requests belonging to an application together prior to dispatching the packed client requests to a heterogeneous resource.

14. The method as recited in claim 13, wherein the at least one application specifies whether the client requests belonging to the at least one application are to be packed.

15. The method as recited in claim 12, wherein estimated performance of a client request includes dynamically modeling performance of the at least one client request of a new application on the heterogeneous resources.

16. The method as recited in claim 15, wherein dynamically modeling performance includes executing the at least one client request of the new application on all available resources.

17. The method as recited in claim 12, wherein computing a priority metric is further based on actual performance, desired performance, and the number and type of resources allocated.

18. The method as recited in claim 12, wherein computing a priority metric is further based on a request slack.

19. A non-transitory computer readable storage medium comprising a computer readable program, wherein the computer readable program when executed on a computer causes the computer to perform the steps of claim 12.

* * * * *